(12) United States Patent
Congdon (10) Patent No.: US 6,311,296 B1
(45) Date of Patent: Oct. 30, 2001

(54) BUS MANAGEMENT CARD FOR USE IN A SYSTEM FOR BUS MONITORING

(75) Inventor: Bradford B. Congdon, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/221,576

(22) Filed: Dec. 29, 1998

(51) Int. Cl.$^7$ .............................. G06F 11/00; G06F 19/00
(52) U.S. Cl. ............................. 714/56; 714/48; 710/102; 713/501
(58) Field of Search .................................. 710/8, 102, 103, 710/18, 126; 714/56, 23, 48, 57; 713/501; 340/825.06

(56) References Cited

U.S. PATENT DOCUMENTS 3,956,615 * 5/1976 Anderson et al. .
4,281,380 * 7/1981 DeMesa, III et al. .
5,911,059 * 6/1999 Profit, Jr. .
5,966,306 * 10/1999 Nodine et al. .

\* cited by examiner

Primary Examiner—Gopal C. Ray
(74) Attorney, Agent, or Firm—Antonelli, Terry, Stout & Kraus, LLP

(57) ABSTRACT

A user-friendly, PCI bus-compliant plug-in management card is provided to evaluate a PCI bus in a host computer system for correct operation. The PCI management card is provided with a PCI bus controller ASIC for tracking error and fault conditions which may occur on a PCI bus and reporting such error and fault conditions locally or remotely over a computer network. The PCI bus controller ASIC may be implemented with a reset snoop which snoops the PCI bus for a bus reset; a clock snoop which snoops the PCI bus for a bus clock changing frequency or dying; a cycle timer which begins counting when a bus cycle starts, resets the counting when the bus cycle ends, and triggers an alarm indicating a hung cycle when the bus cycle has not ended after a predetermined time period; a cycle snoop which snoops the bus for any illegal handshake and any hung cycle triggered from the cycle timer; and an error capture which captures all error and failure conditions snooped from the reset snoop, the clock snoop, the cycle timer, and reports such error and failure conditions to a local processor for transmission to a host system, or to a remote system over a computer network for remote system management.

40 Claims, 6 Drawing Sheets

BUS MANAGEMENT CARD FOR USE IN A SYSTEM FOR BUS MONITORING

TECHNICAL FIELD

The present invention relates to an arrangement and method for tracking and reporting failures which may occur on a system bus in a system.

BACKGROUND

Computer architectures generally include a plurality of separate devices such as processors, memories, and peripheral devices, interconnected by one or more buses. For example, modern computer systems, such as servers, workstations or personal computers (PCS), may include at least a processor, a host memory (typically high-speed dynamic RAM), and a host cache (high-speed static RAM). A local bus such as an Intel x86-type bus may provide a link between the processor, the host memory, and the host cache. As opposed to the local bus, system buses may be used as an interconnect transportation mechanism to transport data between highly integrated peripheral devices, peripheral add-in boards and processor/memory subsystems. One example of system buses used for high speed transfer in servers, workstations, and personal computers is a Peripheral Component Interconnect (PCI) bus. The PCI bus is a high performance 32 or 64 bit synchronous bus with automatic configurability and multiplexed address, control and data lines as described in the latest version of "PCI Local Bus Specification, Revision 2.1" set forth by the PCI Special Interest Group (SIG) on Jun. 1, 1995. Currently, the PCI architecture provides the most common method used to extend computer systems for add-on arrangements (e.g., expansion cards) with new video, networking, or disk memory storage capabilities.

Figure 1:
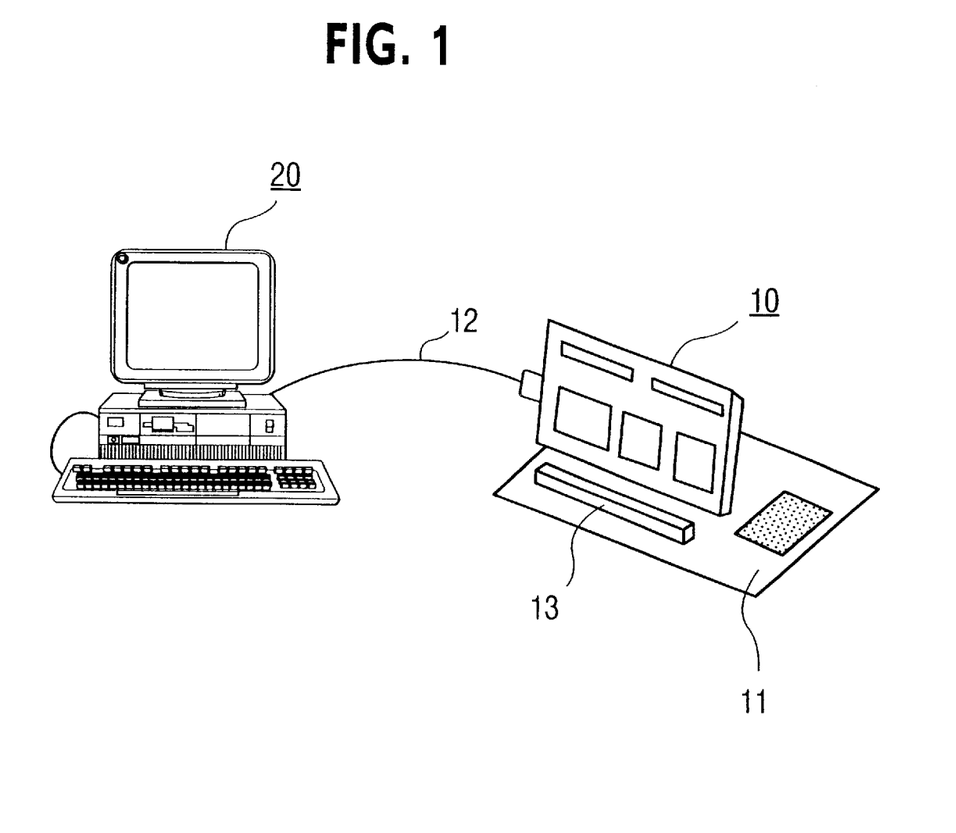
FIG. 1 illustrates an example background PCI bus analyzer for analyzing operation of a PCI bus in a host system.

When a PCI bus is used as an interconnect transportation mechanism in a host system (e.g., personal computer or server), data transfer between, a processor, input/output (I/O) devices, system memory and I/O device is executed at high speed. However, a PCI bus is often a common cause of errors and/or crashing a host system. Many common failures of PCI bus are caused in conjunction with the process of adding or removing add-on adapter cards from the host system which may disrupt an existing electrical connection or form an incomplete new electrical connection, or which may alter the air flow and cooling characteristics inside the host system, or with a new adapter card which may not be well-behaved, and may have driving signals active at inappropriate times. Such failure may compromise the integrity of the host system. Any misbehaved agent on the PCI bus, for example, mayb spuriously drive the PCI reset signal, the PCI clock signal, or any of other PCI signals at any time, possibly causing a host system crash. Consequently, monitoring the PCI bus for correct operation in a host system is desirable. One approach to monitoring the PCI bus operation is to use standard electronic instruments such as PCI bus analyzers or laboratory analysis and diagnostic tools. An example of a PCI bus analyzer used for analyzing a PCI bus operation in a host computer on test bench in laboratory environment as shown in FIG. 1. The PCI bus analyzer 20 is coupled to a PCI bus 13 of a host system 11 by way of a cable 12 and a PCI bus analyzer card 10, and operates in conjunction with an analysis software (installed in PCI bus analyzer 20) for probing the PCI bus 13 to measure and display the PCI bus operation. The PCI bus analyzer 20 may be connected to an add-on card 10 for insertion directly onto a PCI bus 13 to analyze the overall performance of the PCI bus 13. Unfortunately, standard electronic instruments including PCI bus analyzers are neither designed for communications over a computer network, nor designed for continuously tracking and reporting PCI bus events in a host system while it is operating in a normal office or home environment. Moreover, standard electronic instruments are cumbersome to use and often require the attachment of test probes to the PCI bus whose activity is being monitored. Further, standard electronic instruments are dependent on power and clock signals of the PCI bus on which they operate, and thus may be adversely affected by anomalies/failures of such power or clock signals.

Further, such standard electronic instruments reset responsive to a global reset anomalies/failures, and being unable to monitor bus operation during the reset time.

SUMMARY

Accordingly, the present invention is directed to a bus monitoring apparatus for tracking operation of a bus in a host system. The bus monitoring apparatus includes at least one of a local clock and a local reset which are separate and independent from the host system; and a bus monitor having operation controlled by at least one of the local clock and the local reset, for tracking events on the bus.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of bus standards, including new bus standards with may become available as bus technology develops in the future. For simplicity and for purposes of limiting the volume of this disclosure to a manageable/readable size, discussions will concentrate mainly on exemplary use with monitoring of a PCI bus, although the scope of the present invention is not limited thereto.

Figure 2:
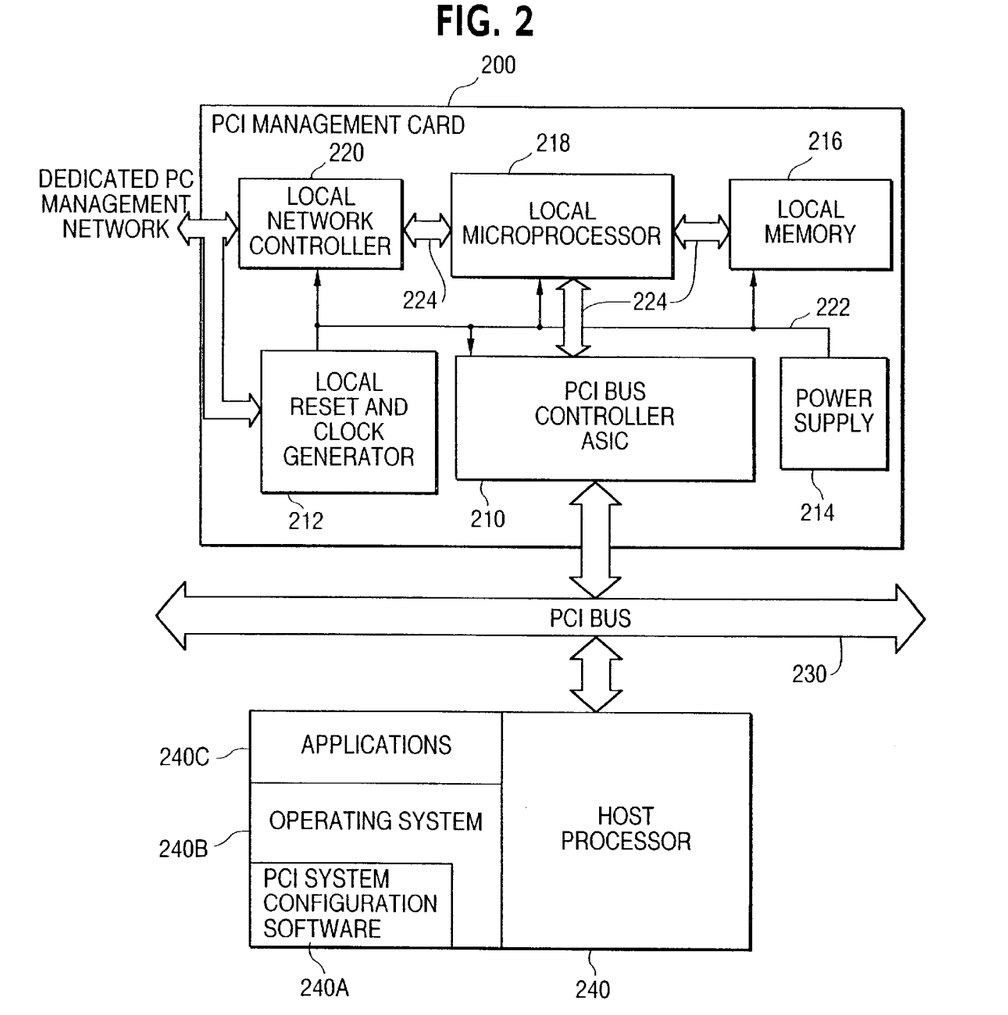
FIG. 2 illustrates an example PCI management card (including a bus analyzer) for monitoring a PCI bus in a host system for correct operation according to the principles of the present invention.

Attention now is directed to the drawings and particularly to FIG. 2, which illustrates an example PCI management card 200 for managing/evaluating a PCI bus 230 in a host system for correct operation according to the principles of the present invention. An exemplary PCI management card 200 may be both mechanically and electrically PCI-compliant, and a user-friendly, self-contained fault detection device that operates fully in conjunction with a running host system. The exemplary PCI management card 200 may be constructed or programmed to observe input/output (I/O) signals passing through a PCI bus 230 to a host processor 240 and I/O devices such as a mouse, a keyboard, floppy and hard disk(s), and network ports, etc., so as to monitor and report error and failure conditions that may occur on the PCI bus 230.

In contrast to PCI bus analyzers or other laboratory analysis and diagnostic tools available in the market, the PCI management card 200 according to the present invention may run in a user's environment, invisible to normal operation, and may be fully enclosed in a casing of the host system. As intended by the present invention, the PCI management card 200 may be designed to provide ease of installation with PCI slots that are prevalent in many host systems. When plugged into a PCI slot (not shown) of a host system, the PCI management card 200 may evaluate a PCI bus 230 for correct operation, within any user-designated time period or on a continuous basis, such as by sensing any anomalous or erratic behavior which may occur on the PCI bus 230, including the event of a complete host system failure. In addition, an evaluating/monitoring portion of the PCI management card 200 may store a monitoring log/record of a predetermined number of most recent bus operations or just any anomaly or failure, or may immediately report the same to a local microprocessor 218 on the PCI management card 200. Depending on the implementation, software running on the PCI management card 200 may signal locally to a host system or remotely to a remote system (not shown) on a computer network that an anomalous event has occurred, and may communicate with either a host system or a remote system on a computer network as to what type of anomalous event it was. Examples of such host and remote systems include personal computers (PCs), workstations, and servers. The PCI management card 200 may be configured as a separate and independent PCI plug-in card, or alternatively, as part of a system Management Module (SMM) card of a host system to provide extra functionality to the host SMM card.

As shown in FIG. 2, the PCI management card 200 may be a miniature independent processing system that has its own operating system, power supply, local reset and clock separate and independent from the host system i.e., to allow the PCI management card 200 to operate independently of the host system, such that the management card's operation can be unaffected by anomalies/failures on the PCI bus 230, and can continue to operate even in the event of total host system crash or failure. Specifically, the PCI management card 200 may include a PCI bus controller 210, a local reset and clock generator 212, a power supply 214, a local memory 216, a local microprocessor 218, and a local network controller 220. A local bus 222 may provide the common link between the PCI bus controller 210, the local reset and clock generator 212, the power supply source 214, the local memory 216, the local microprocessor 218, and the local network controller 220. In addition, an address/data/control bus 224 may provide the direct link for communications between the local microprocessor 218 to each of PCI bus controller 210, the local memory 216, and the local network controller 220.

For purposes of completeness, FIG. 2 also shows a host processor 240 of the host system. The host processor 240 may be a "Pentium™" family of microprocessors (manufactured by Intel Corp.; trademark to Intel Corp.) and may include several software products such as a PCI system configuration software 240A, a host operating system 240B, and one or more application programs 240C. The respective functions of the software are well-known and need not be described in detail herein. The PCI system configuration software 240A is part of what is typically called "BIOS" (Basic Input/Output System) software which performs the power-on diagnostic for the host system and provides the various level routines to support system configuration and data input. PCI system configuration functions used may be as outlined by the "PCI BIOS Specification, Revision 2.0" as set forth by the PCI Special Interest Group (SIG) in Jul. 20, 1993. Such specification sets forth sufficient information to enable a programmer to design a suitable configuration software module for PCI system configuration software 240A.

Discussion now turns to the local reset and clock generator 212, and in particular, turns first to the local clock generator. More specifically, the present invention is advantageous in that it includes its own local clock generator which is independent from any global (bus/host) clock signal appearing on the bus or within the host system. Such local clock generator may be a crystal or other arrangement, and may include related circuitry useful in clock generator arrangements. The present invention (and even the entire management card) may operate with such independent local clock generator. Such is advantageous in that it allows the present invention to operate independently of the global bus/host clock, such that the present inventions's monitoring, recording and/or reporting (or any other) operations can be unaffected by any global clock anomalies/failures on the bus or host system, and can continue to operate.

As to the frequency of the independent local clock, such clock frequency may be at a same frequency as a global (bus/host) clock. However, a matching frequency may be disadvantageous in a number of regards. First, a phase-locked loop (PLL) circuit or other synchronizing arrangement may be needed to a match local clock frequency and/or phase of the present invention's clock generator to that of the global clock signal. Further, some bus specifications (e.g., the PCI bus specification) allow a bus clock to change frequency during operation, and thus the present invention's clock generator may need likewise to have the ability to change clock frequency. Still further, individual bus clock cycles may be difficult to monitor if phases between the local and global clocks are mismatched a predetermined amount and/or response times (e.g., setup times) of monitoring circuits are incorrect, resulting in an unreliable "metastable" condition. Accordingly, the present invention may also be practiced by having a local clock frequency which is faster than that of the global bus/host clock. More particularly, any predetermined frequency may be selected. For example, with typical PCI bus arrangements operating with a bus clock frequency of up to 33 MHz, the predetermined frequency of at least 40 MHz, e.g., 50 MHz, may be used.

Use of a faster clock frequency is advantageous in a number of regards. First, as the present invention operates at a faster clock frequency, it may complete each local monitoring cycle faster than a bus clock cycle, and thus may always be ready to monitor a next bus clock cycle operation, i.e., slower cycle global bus operations may be captured and converted up in frequency to the present invention's local clock frequency for use within the arrangement of the present invention. Further, as the example 50 MHz frequency is faster than all typical PCI bus arrangements operating with a bus clock frequency of up to 33 MHz, the example 50 MHz embodiment may be generic to all 33 MHz or less bus arrangements. Further, even if a 33 MHz or less bus implementation has a changing clock frequency, there is no need to change a clock frequency of the present invention, as the operations of the present invention are not dependent on the global clock frequency.

The present invention is not limited to the example 50 MHz embodiment, but instead may have a local clock generator having an even faster local clock frequency. For example, while the above discussion mentions typical PCI bus arrangements operating with a bus clock frequency of up to 33 MHz, the PCI bus specification actually allows a PCI bus to operate at a much greater bus clock frequency. Further, other types of bus systems (especially those which may become available in the future as bus technology develops), may also operate at greater bus clock frequencies. The present invention is intended for use with all bus clock frequencies.

Discussion turns next to the local reset. More specifically, the present invention is advantageous in that it includes its own local reset which is independent from any global (bus/host) reset signal appearing on the bus or within the host system. All circuits with respect to the present invention (and even the entire management card) may be immune to any global reset, and instead be reset with such independent local reset. Such is advantageous in that it allows the present invention to operate independently of any global reset on the bus or host system, such that the present inventions's monitoring, recording and/or reporting (or any other) operations can be unaffected by any global reset, and can continue to operate. Such allows the present invention to monitor, record and or report any global reset anomalies/failures on the bus or host system. The local reset may be triggered through any suitable means, for example, by physical activation of a mechanical switch, by a predetermined specialized reset command sent from the host system through the bus and recognized by the present invention, and a predetermined specialized reset command sent from a remote system through a network and recognized by the present invention.

The power supply 214 may be a single battery or a set of batteries or any other type of power storage or generation for providing optional power backup. The PCI management card 200 may be designed to use low-power circuitry to extend the life of these batteries. Despite the batteries, in normal operating conditions, the PCI management card 200 may use power from a host system. However, when the host system power becomes unreliable or dissipates completely, the power supply 214 may automatically sense the power fault condition and seamlessly take over responsibility for providing power to all the circuitry on the PCI management card 200 for operation.

The local memory 216 may include Flash BIOS (Basic Input/Output System) chips for holding permanent boot-up code for the local microprocessor 218 and DRAM chips for holding temporary storage for application software and an operating system that is independent from a host operating system. The flash BIOS chips may, for example, be flash memory product numbers 28F0088C3, 28F016C3, 28F032C3, 28F800C3, 28F160C3, 28F320C3 (manufactured by Intel Corp.)

The local microprocessor 218 may be a low-power 32-bit microprocessor for running an operating system, with software which can read and write to local memory 216 as well as to registers in the PCI Bus Controller 210 and in the local network controller 220. The local microprocessor 218 on the PCI management card 200 may be an X86 family microprocessor (manufactured by Intel Corp.; trademark to Intel Corp.)

The local network controller 220 may provide an interface to a computer network, and more particularly, to a dedicated PC management network such as a local area network including an Ethernet, Token Ring, Fiber Data Distribution Interface (FDDI) or Asynchronous Transfer Mode (ATM) arrangement. Other examples of such a computer network include a local area network (LAN), a wide area network (WAN), a campus area network (CAN), a metropolitan area network (MAN), a global area network (GAN), and a system area network (SAN). In addition, the local network controller 220 may also include, for example, an integrated Intel 56-K modem so that a remote user can talk to the PCI management card 200 by way of a telephone line, as an alternative to a computer network. Packets of data may be both sent and received through the computer network. Typically, the local microprocessor 218 may send a data packet over this computer network to a remote user at a remote system when a pre-defined trigger condition has occurred on the PCI management card 200, such as a PCI bus error sensed by the PCI bus controller 210. This data packet may alert the remote user that an error occurred. The computer network may also be used by the remote user to send and receive commands and data to/from the local microprocessor 218 within the PCI management card 200. For example, the remote user may send a command to read a register in the PCI bus controller 210. The local microprocessor 218 may receive this command, read the data from the PCI bus controller 210, and send the same back to the remote user over the computer network.

The PCI bus 210 may be fully realized in an ASIC (Application Specific Integrated Circuit), and may include PCI and application interfaces, state machines (for master and target control), buffers (for the read and write data to support the bus transfer rate), and PCI configuration registers (which are programmable registers and written by local microprocessor 218 over the local bus 222), as described in accordance with the latest version of "PCI Local Bus Specification, Revision 2.1" by the PCI Special Interest Group (SIG) in Jun. 1, 1995. The PCI configuration registers may also be written and read by the host processor 240 executing the PCI system configuration software 240A over PCI bus 230. Information written into these registers may configure the device resources such as I/O address, memory address, and interrupt level of the PCI management card. The PCI Local Bus Specification, Revision 2.1 sets forth a list of configuration registers needed in interfacing the PCI management card 200 to the PCI bus 230, and provides sufficient information to enable an ASIC designer to design a suitable PCI bus controller ASIC specifically for the PCI management card 200.

In addition, the present invention may be implemented with adaptive circuitry (not shown) to capture bus operations (e.g., signals) occurring at the lower bus clock frequency, (e.g. 33 MHz) and adapt (e.g. translate) the same into the higher local clock frequency (e.g., 50 MHZ) domain for use with the present invention. In one embodiment of the present invention, a synchronizing circuit in a form of flip-flops is used to adapt signals on the PCI bus 230 running on a slower clock. Such flip-flops are pairs of high-speed flip-flops connected back-to-back, each pair of which receives a slower signal (in this exemplary embodiment, a 33 MHz PCI signal) at its input, and produces a version of that signal at its output which matches the original signal as closely as possible but now in the higher speed (in this exemplary embodiment, a 50 MHz).

Further, the PCI bus controller ASIC 210 may include custom-designed functional arrangements to monitor events such as error and fault conditions which may occur on the PCI bus 230, and to store a record of those error and fault conditions in its register space (configuration registers). The PCI bus controller ASIC 210 may also generate an interrupt output signal that is used to notify the local microprocessor 218 when an error or fault condition on the PCI 230 is detected. Similar to the local memory 216 and the local network controller 220, the PCI bus controller ASIC 210 may also connect to the local microprocessor 218 through the 386EX (e.g.) address/data/control bus 220, so that the microprocessor is able to read and write to registers in the PCI Bus Controller ASIC 210. The types of error and fault conditions which may be tracked by the PCI bus controller ASIC 210 for indicating that a host system is failing, may include ones or all of the following events: (1) when a PCI reset occurred unexpectedly; (2) when a PCI clock stopped operating; (3) when a PCI cycle started and never completed; and (4) when a PCI cycle started and completed with an illegal handshake (as discussed in greater detail ahead) between the PCI master and PCI target. These examples of error and fault conditions are not exhaustive however. Other types of error and fault conditions may be monitored by the present invention via suitable construction and/or programming.

Figure 3:
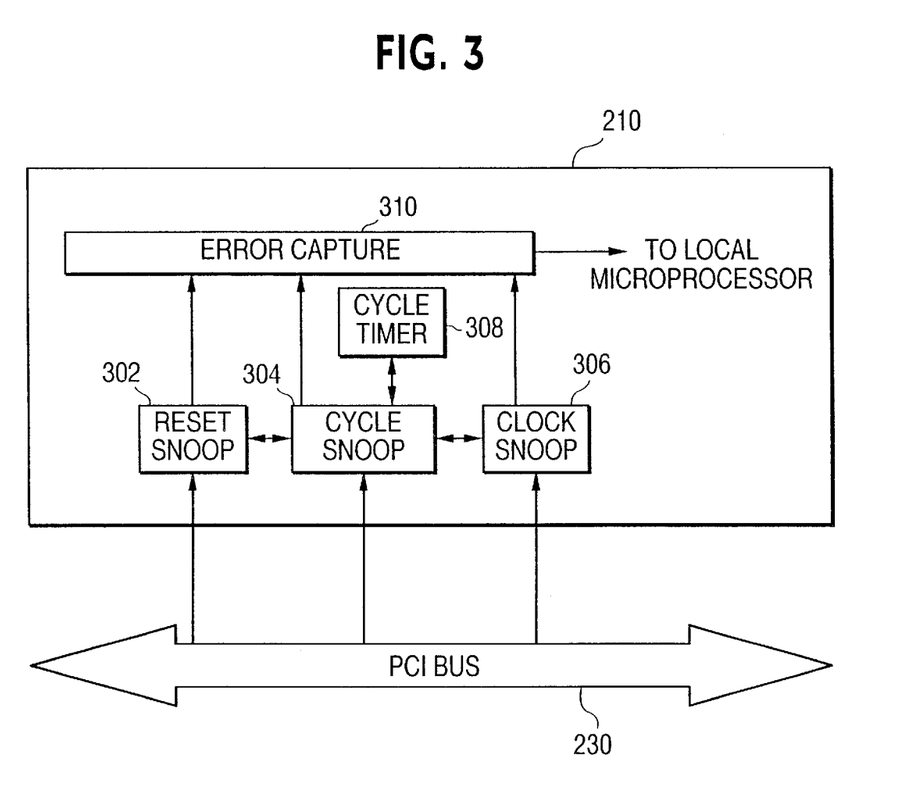
FIG. 3 illustrates a block diagram of an example PCI bus monitor of the PCI management card as shown in FIG. 2.

Turning now to FIG. 3, a functional block diagram of parts of an example PCI bus controller ASIC 210 for monitoring, recording and/or reporting error and fault conditions on the PCI 230. More particularly, the PCI bus controller ASIC 210 may include: a reset snoop 302 which may snoop the PCI bus 230 for a PCI bus reset; a cycle snoop 304 which may snoop the PCI bus 230 for anomalies/failures in cycles on the PCI bus 230; (e.g., illegal handshakes, hung cycles, etc.); and a clock snoop 306 which may snoop the PCI bus 230 for a PCI bus clock radically changing frequency or dying. With respect to the cycle snoop 304, a cycle timer 308 may begin counting discrete time by way of a counter (not shown) when a PCI bus cycle starts, and reset the counter when the PCI bus cycle ends. If the PCI cycle has not ended after a predetermined time period, then the host system may be considered "hung". In a current implementation, this counter may be set to count any fixed time value (predetermined time period), e.g., 164 μs. However, the counter may alternatively be programmable to hold a range of possible time-out values.

An error capture 310 may capture the error and fault conditions snooped from reset snoop 302, cycle snoop 304, and clock snoop 306, and also may report such failures to a local microprocessor 218 for purposes of system management. The error capture 310 may store, in a series of register bits from configuration registers of PCI bus controller ASIC 210 as defined by the "PCI Local Bus Specification, Revision 2.1" (or within any other suitable type of writable/ readable memory), information representing each type of error and fault conditions which were captured, and may interrupt the local microprocessor 218 on the PCI management card 200. The local microprocessor 218 may then read the configuration registers of PCI bus controller ASIC 210. Depending on the implementation, software from the local memory 216 running on the PCI management card 200 may then signal either locally to a host system or remotely to a remote system over a computer network that an anomalous event (fault condition) has occurred on the PCI bus 230. In addition, such software may further communicate with either a host system or a remote system over a computer network as to what type of anomalous event occurred, e.g., for analysis purposes and a proactive response, such as providing a host user or a remote user on a computer network an opportunity, for example, to shut down the host system remotely before the host system crashes.

For example, if the PCI management card 200 is installed in a host system (e.g., server) on a computer network such as a local area network (LAN), the PCI management card 200 may provide server diagnostics and real-time monitoring to assist remote users (LAN administrators) in proactively managing, repairing and enhancing the performance of the host system from a remote system (e.g., administrative) over a computer network. In other words, the PCI management card 200 may provide an arrangement for remote system management information and capabilities necessary for LAN remote users to diagnose host system problems such as those error and fault conditions which may occur on the PCI bus 230 when the host server crashes or exceeds defined operating parameters. If any of the error and fault conditions occurs on the PCI bus 230 (such as: (1) when PCI reset occurred unexpectedly; (2) when PCI clock stopped operating; (3) when PCI cycle started and never completed; and (4) when PCI cycle started and completed with an illegal handshake between the PCI master and PCI target), a remote system (e.g., administrative server) may initiate corrective actions such as, for example, rebooting or resetting a host system (e.g., remote server). As a result, server downtime is minimized and the overall cost of server operations is reduced. The network capability of PCI management card 200 may be designed to allow LAN administrators to manage and even reboot not only one server, but groups of remote servers.

If, on the other hand, the PCI management card 200 is installed in a host system that is not on a computer network such as a local area network (LAN), the PCI management card 200 may not provide remote system management. Rather, the PCI management card 200 provides server diagnostics and real-time monitoring to assist a host user in managing operation of the host system locally. Consequently, when any of the error and fault conditions occurs on the PCI bus 230, the PCI management card 200 may store the error and fault conditions. The host system may read such an error and fault condition stored in the PCI management card 200 at any time, possibly after the host system is rebooted after a crash in which the PCI management card 200 was able to monitor and store information for analyzing a cause of such a crash. Alternatively, the PCI management card 200 may report such an error or fault condition to the host user in response to instructions from the host processor 240 by way of a display device, for example.

Figure 4:
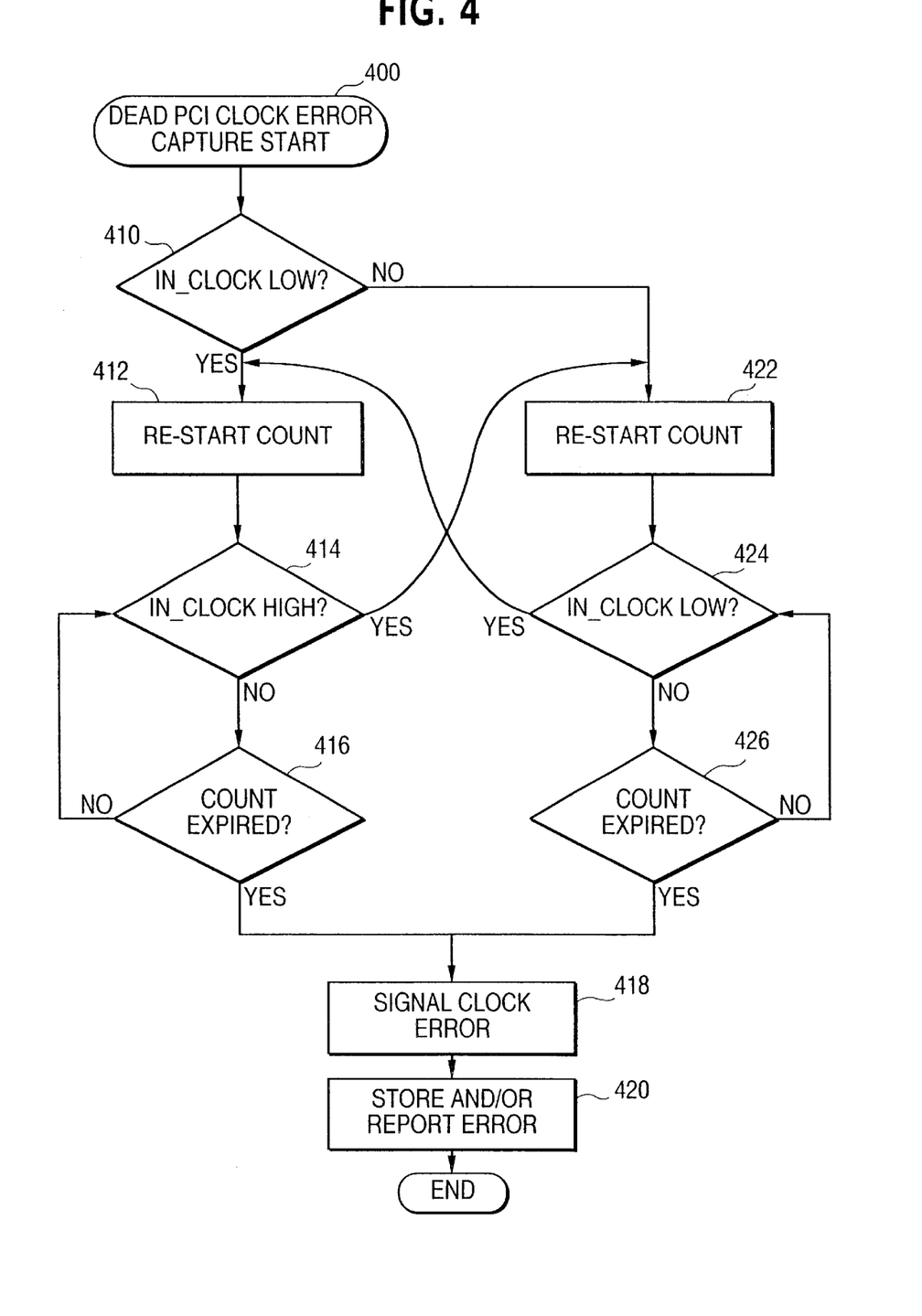
FIG. 4 illustrates a flowchart of an example PCI clock snoop algorithm which may be performed by an example PCI management card for snooping and capturing a PCI clock error according to the principles of the present invention.

FIG. 4 illustrates a flowchart of an example PCI clock snoop algorithm which may be performed by an example PCI management card 200 for snooping and capturing PCI clock anomalies/failures according to the principles of the present invention. It should be noted here that a signal "in_clock" is an incoming clock that is an adapted version of a PCI clock. That is, the signal "in_clock" indicates the PCI clock signal, after the PCI clock signal has traveled through a pair of synchronizing flip-flops and entered a local clock domain. The PCI bus 230 may be a standard 32-bit bus operating at a standard 33 MHz, or the PCI clock may run slower than 33 MHz. In any case, the PCI clock running on the PCI bus 230 may simply be a simple square wave with alternating high and low voltage levels. If the original PCI clock is operating correctly, then the in_clock signal should exhibit alternating high and low voltage levels which alternate at every occurrence of a predetermined amount of time. Since the clock snoop algorithm is executed using a local clock of 50 MHZ as described, the high voltage level or the low voltage level might take several local clock cycles (i.e. depending on the speed of the global bus/host clock signal in comparison to the local clock signal), but eventually one will change to the other if the PCI clock is operating correctly. If the in_clock signal ever stops alternating between high and low voltage levels for a predetermined time period, a fault clock condition on the PCI bus 230 is captured. Further, the in_clock alternating at inconsistent or erratic amounts of time likewise may be indicative of a bus/host clock anomaly/failure.

The example PCI clock snoop algorithm as shown in FIG. 4 will now be described with reference to FIGS. 2 and 3 as follows. First, when the PCI clock snoop algorithm is initiated at block 400, the PCI bus controller ASIC 210 (clock snoop 306) determines whether an in_clock on the PCI bus 230 is at a "low" level at block 410. If the in_clock on the PCI bus 230 is at a "low" level, the PCI bus controller ASIC 210 resets a counter and restarts counting time at block 412. During the counting operation, the PCI bus controller ASIC 210 checks whether the in_clock on the PCI bus 230 has switched to a "high" level at block 414. If the in_clock has not switched to a "high" level, the PCI bus controller ASIC 210 determines whether the counting for a predetermined time period has occurred at block 416. If the counting for a predetermined time period has not expired at 416, the PCI bus controller ASIC 210 returns to block 414 of the PCI clock snoop algorithm. However, if the counting of a predetermined time period has expired at block 416, the PCI bus controller ASIC 210 determines that a PCI clock error has occurred on the PCI bus 230 (that is, when a PCI clock stopped operating) at block 418, and stores and/or reports such a PCI clock error for system management locally or remotely over a computer network at block 420.

At block 410, if the in_clock on the PCI bus 230 is not at a "low" level, the PCI bus controller ASIC 210 also resets a counter and restarts counting time for a predetermined time period at block 422. During the counting operation, the PCI bus controller ASIC 210 also checks whether the in_clock on the PCI bus 230 has switched to a "low" level at block 424. If the in_clock has not switched to a "low" level, the PCI bus controller ASIC 210 determines whether the counting for a predetermined time period has expired at block 426. If the counting for a predetermined time period has not expired, the PCI bus controller ASIC 210 returns to block 424 of the PCI clock snoop algorithm. Likewise, if the counting of a predetermined time period has expired at block 426, the PCI bus controller ASIC 210 determines that a PCI clock error has occurred on the PCI bus 230 at block 418. In either blocks 414 and 424, if the in_clock has switched to an opposite level, that is to a "high" level at block 414, and to a "low" level at block 424, the PCI bus controller ASIC 210 restarts the counting for a predetermined time period for an opposite level, at either block 422 or block 412.

While the example FIG. 4 algorithm has been described as monitoring whether the bus/host clock signal alternates or switches within the expiration of the predetermined amount of time (useful for detecting hung or dead bus/host clocks), the present invention may likewise monitor other characteristics of the bus/host clock. For example, as most bus implementations operate at a constant speed, the bus/host clock can be expected to alternate at regular intervals (i.e., at each occurrence of a predetermined time, plus or minus a reasonable amount of error). Detection of a bus/host clock which alternates at an irregular time (e.g., too soon) may likewise be taken as bus/host clock anomaly or failure.

Figure 5:
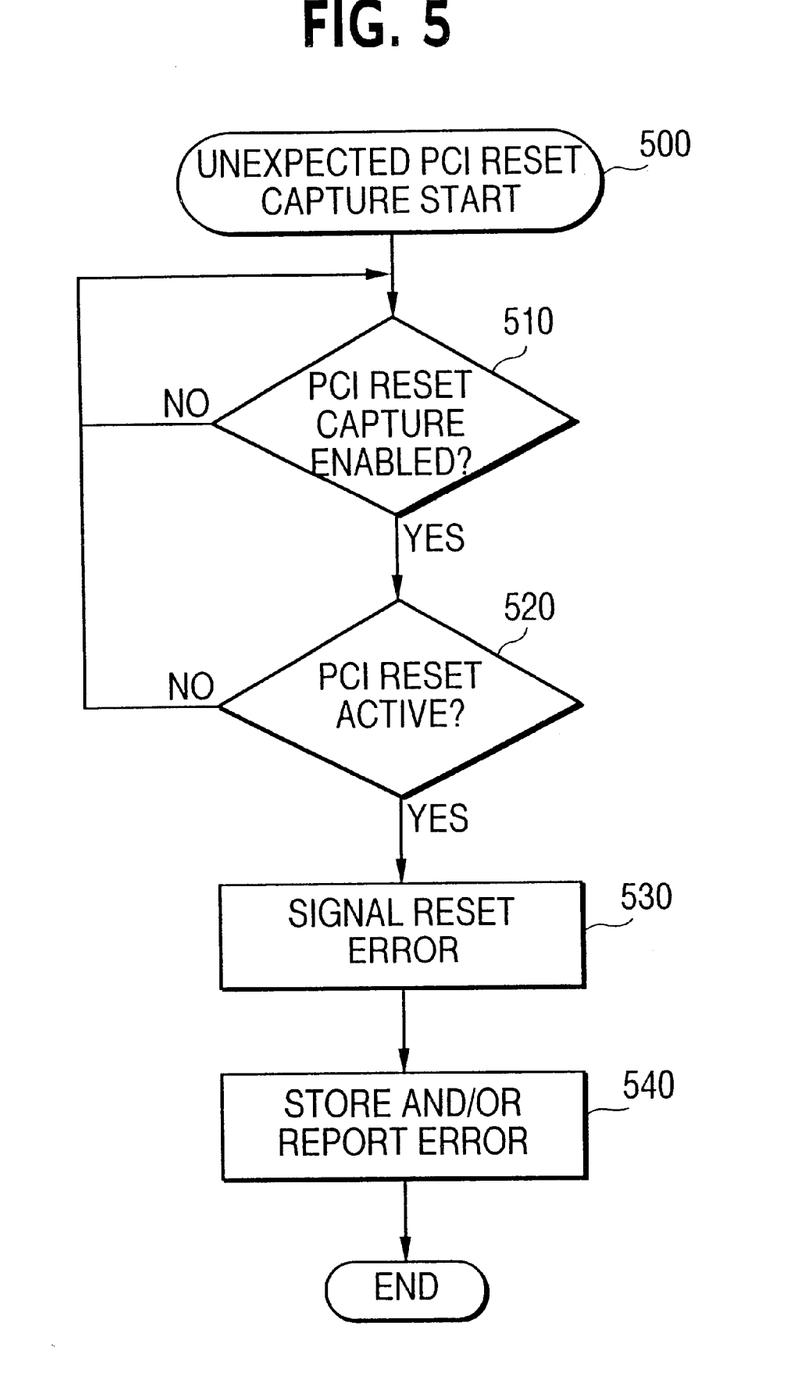
FIG. 5 illustrates a flowchart of an example PCI reset snoop algorithm which may be performed by an example PCI management card for snooping and capturing an unexpected PCI reset according to the principles of the present invention.

FIG. 5 illustrates an example flowchart of an example PCI reset snoop algorithm which may be performed by an example PCI management card 200 for snooping and capturing an unexpected PCI reset according to the principles of the present invention. It should be noted here that the PCI bus 230 may be reset at any time by a host system using local hardware and software. For example, a PCI bus reset may be asserted from a host processor 240 of the host system. Alternatively, a PCI bus reset may be asserted from a remote system over a computer network by way of a local microprocessor 218 of the PCI management card 200. Reset is normally used by the host processor 240 or local processor 218 during initialization (i.e., boot up) of the host system to reset the PCI bus 230, or responsive to determination that the PCI bus operation is faulty and needs to be reset. As mentioned previously, the present invention may be constructed and/or programmed to be immune to such global resets (and be responsive only to local resets), such that the present invention can be operable to monitor, record and/or report any global reset anomalies/failures.

The example PCI reset snoop algorithm as shown in FIG. 5 will now be described with reference to FIGS. 2 and 3 as follows. The FIG. 5 example is illustrative of an advantageous enablement/disablement feature that may be incorporated with respect to any of the snooping algorithms/operations of the present invention. More particularly, at times, it may be useful to be able to selectively disable one or more of the snoop algorithms/operations. Accordingly, the present invention can be constructed or programmed to allow disablement of a particular snoop algorithm/operation, wherein the particular snoop algorithm/operation would then include a loop such as that associated with FIG. 5's block 510 so as to prevent execution of the snoop algorithm/operation until such algorithm/operation is enabled. The FIG. 5 block 510 is advantageous because it allows the PCI reset snoop algorithm/operation to be disabled during an initial system boot-up so as not to capture the initial boot-up global reset of the bus, and thereafter to be enabled to capture any anomalous global rest. Turning now to FIG. 5, when the PCI reset snoop algorithm is initiated at block 500, the PCI bus controller ASIC 210 (reset snoop 302) determines whether a PCI reset capture is enabled at block 510. One of register bits from configuration registers in the PCI bus controller ASIC 210 is used to indicate whether the PCI reset capture is enabled or disabled. For example, the register bit having a predetermined logical value may be taken as being indicative that the PCI reset capture is enabled. Conversely, the register having an opposite logical value may be taken as being indicative that PCI reset capture is disabled. The PCI reset capture may be enabled at any time, for example, when the PCI reset is asserted either locally by a host system or remotely by a remote system over a computer network.

If the PCI reset capture is enabled, the PCI bus controller ASIC 210 determines whether the PCI reset is active at block 520, that is, whether the PCI bus 230 reset occurs. The PCI reset snoop algorithm may be programmed to combine the reset snoop information with the cycle hung information to determine whether or not the reset occurred during a PCI cycle. If the PCI reset is active at block 520, the PCI bus controller ASIC 210 may determine that a signal reset error has occurred on the PCI bus 230 (that is, when a PCI reset is asserted) at block 530, and may store and/or report such a signal reset error for system management locally or remotely over a computer network at block 540.

Figure 6:
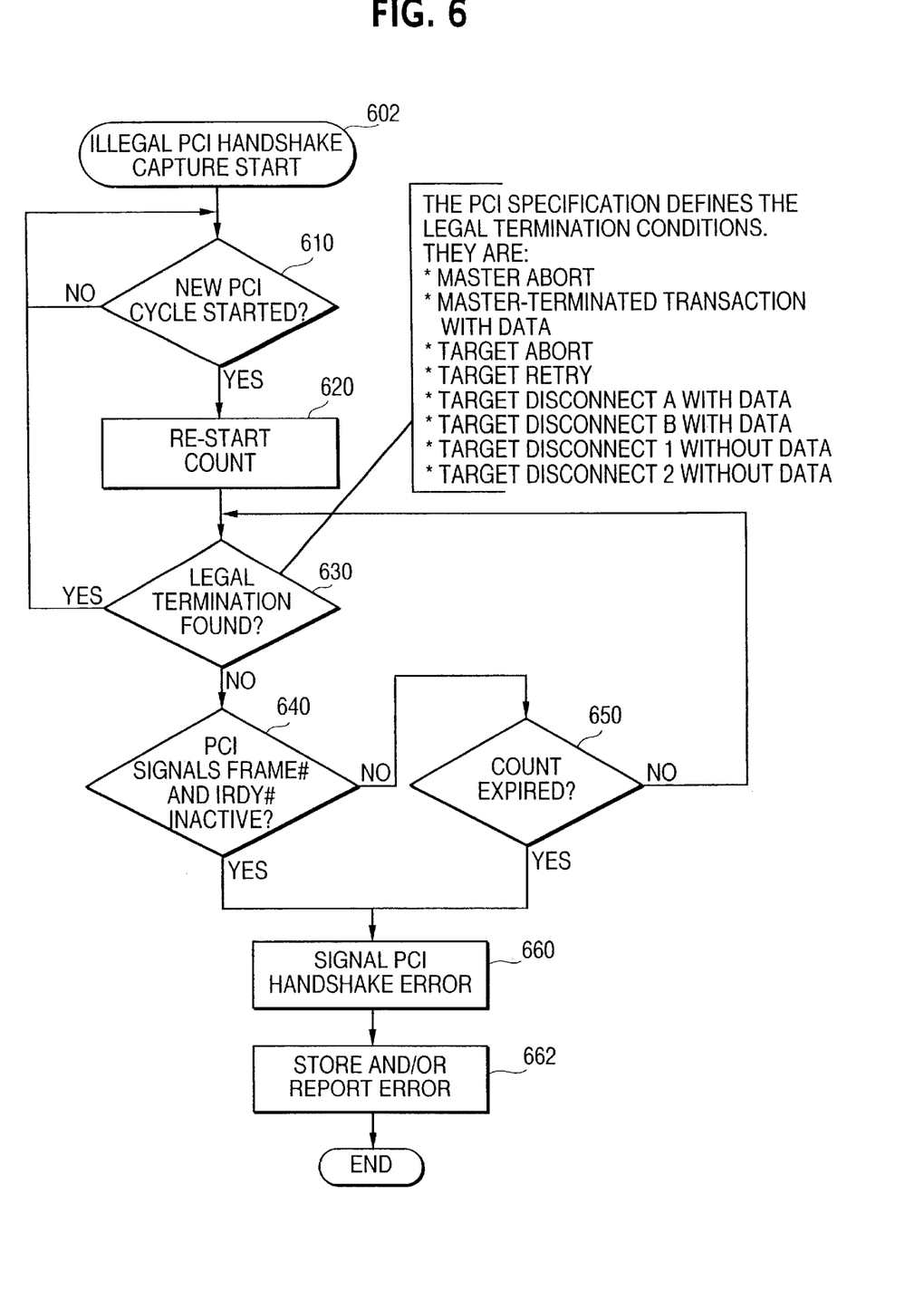
FIG. 6 illustrates a flowchart of an example PCI cycle snoop algorithm which may be performed by an example PCI management card for snooping and capturing an illegal PCI handshake according to the principles of the present invention.

FIG. 6 illustrates an example flowchart of an example PCI cycle snoop algorithm which may be performed by an example PCI management card 200 for snooping and capturing an illegal PCI handshake according to the principles of the present invention. Signals used include a PCI clock, Frame# (Cycle Frame), IRDY# (Initiator Ready), TRDY# (Target Ready), STOP# (Stop) and DEVSEL# (see "PCI Local Bus Specification, Revision 2.1."). For example, the signals labeled Frame# and IRDY# are output on the PCI bus 230 by the PCI bus master agent, and the signals labeled TRDY#, STOP# and DEVSEL# are signals generated by the PCI bus target agent. As an example, the host processor 240 is the master agent when it desires to access the configuration registers in the PCI bus controller ASIC 210, acting as the target agent. In addition to those cases in which the PCI bus controller 210 is either the master agent or the target agent, the PCI bus controller ASIC 210 may also snoop PCI cycles on the PCI bus 230 between any master and target on the PCI bus 230.

As defined by the "PCI Local Bus Specification, Rev. 2.1", there are eight legal termination conditions, including: (1) Master-Abort termination, (2) Master-Terminated transaction with data, (3) Target-Abort termination, (4) Target-Retry, (5) Target-Disconnect A with data, (6) Target-Disconnect B with data, (7) Target-Disconnect 1 without data, and (8) Target-Disconnect 2 without data. Those legal termination conditions are well-known and, therefore, need not further described in detail herein. An illegal PCI handshake may be, for example, any cycle completion (signals Frame# and IRDY# inactive) which did not complete in one of the eight pre-defined legal termination sequences defined in the "PCI Local Bus Specification, Rev. 2.1."

The PCI cycle snoop algorithm as shown in FIG. 6 will now be described with reference to FIGS. 2 and 3 as follows. First, when the PCI cycle snoop algorithm is initiated at block 600, the PCI bus controller ASIC 210 (cycle snoop 304) determines whether a new PCI cycle on the PCI bus 230 is started at block 610. When the new PCI cycle on the PCI bus 230 is started, the PCI bus controller ASIC 210 resets a counter and restarts counting time for a predetermined time period at block 620. During the counting operation, the PCI bus controller ASIC 210 determines whether any of the legal termination conditions as defined in the "PCI Local Bus Specification, Rev. 2.1" is found on the PCI bus 230 at block 630. If any one of those legal termination conditions as defined in the "PCI Local Bus Specification, Rev. 2.1" is found on the PCI bus 230, the PCI bus controller ASIC 210 returns to block 610 awaiting for a new PCI cycle. If none of the legal termination conditions as defined in "PCI Local Bus Specification, Rev. 2.1" is found on the PCI bus 230, the PCI bus controller ASIC 210 determines whether the signals Frame# and IRDY# are inactive at block 640, that is, whether there is an illegal PCI handshake. When the signals Frame# and IRDY# are inactive, the PCI bus controller ASIC 210 determines that a signal PCI handshake error has occurred on the PCI bus 230 at block 660, and stores and/or reports such a signal PCI handshake error for system management locally or remotely over a computer network at block 662.

If, on the other hand, the signals Frame# and IRDY# are not inactive, the PCI bus controller ASIC 210 determines whether the counting for a predetermined time period has expired at block 650. If the counting for a predetermined time period has not expired at block 650, the PCI bus controller ASIC 210 returns to block 630 of the PCI cycle snoop algorithm. However, if the counting for a predetermined time period has expired at block 650, the PCI bus controller ASIC 210 determines that a signal PCI handshake error has occurred on the PCI bus 230 (that is, when a PCI cycle started and completed with an illegal handshake) at block 660, and may store and/or report such a signal reset error locally or remotely over a computer network.

As described from the foregoing, the PCI management card according to the present invention has several advantages. First, unlike PCI bus analyzers and other laboratory analysis and diagnostic tools current available in the market, the PCI management card is a compact, cost effective addition to a host system that is fully enclosed in the host system, invisible to normal operations. Second, the PCI management card has its own clock and reset circuitry and power supply which provides immunity to global clock and global reset anomalies and allows tracking of any anomalous or erratic behavior which may occur at any time on the PCI bus. The present invention may record and/or report such anomaly or failure to a local microprocessor for purposes of remote system management. For example, the PCI management card may report if the PCI clock died, and if it died in the middle of a PCI cycle; if the PCI was reset, and if it was reset in the middle of a PCI cycle; if a PCI cycle simply never completed; if a PCI cycle ended in an illegal handshake. When an illegal PCI handshake occurs, the PCI management card may provide an early warning and an opportunity, for example, to shut down the system before a host system crash or corrupted data occurs.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the cycle snoop circuitry may be expanded to capture every case on the PCI bus of a PCI hung cycle or of a PCI illegal handshake which may occur beyond those legal termination conditions defined by the "PCI Local Bus Specification, Rev. 2.1." Further, the various operation of the ASIC 210 may instead be implemented via a suitably arranged/programmed processor. In addition, system buses may also include an Industry Standard Architecture (ISA) bus, an Extended Industry Standard Architecture (EISA) bus, and a Micro-Channel Architecture (MCA) bus. Many modifications may be made to adapt a particular situation to the teachings of the present invention without departing from the central scope thereof. Therefore, it is intended that the present invention not be limited to the various exemplary embodiments disclosed, but that the present invention includes all embodiments falling within the scope of the appended claims.

What is claimed is:

1. A bus monitoring apparatus for tracking operation of a bus in a host system, comprising:

at least one of a local clock and a local reset which are separate and independent from the host system; and a bus monitor having operations controlled by at least one of said local clock and said local reset, for tracking events on the bus, wherein said events include error and fault conditions which may occur on the bus, including one or more of the following: (1) when a bus reset occurred unexpectedly; (2) when a bus clock stopped operating; (3) when a bus cycle started and never completed; and (4) when a bus cycle started and completed with an illegal handshake.

2. A bus monitoring apparatus as claimed in claim 1, wherein said bus monitor further reports occurrence of said events on the bus over a computer network for remote system management.

3. A bus monitoring apparatus as claimed in claim 2, wherein said bus includes one of a Peripheral Component Interface (PCI) bus, an Industry Standard Architecture (ISA) bus, an Extended Industry Standard Architecture (EISA) bus, and a Micro-Channel Architecture (MCA) bus, and wherein said events include error and fault conditions which may occur on the bus.

4. A bus monitoring apparatus as claimed in claim 1, wherein said bus includes a Peripheral Component Interface (PCI) bus.

5. A bus monitoring apparatus as claimed in claim 1, wherein said bus includes one of a Peripheral Component Interface (PCI) bus, an Industry Standard Architecture (ISA) bus, an Extended Industry Standard Architecture (EISA) bus, and a Micro-Channel Architecture (CA) bus for serving as an interconnect transportation mechanism to transport data between highly integrated peripheral devices, peripheral add-in boards and processor/memory subsystems of the host system.

6. A bus monitoring apparatus as claimed in claim 1, wherein said bus monitor comprises:
    a reset snoop which snoops the bus for a bus reset;
    a clock snoop which snoops the bus for a bus clock changing frequency;
    a cycle timer which begins when a bus cycle starts, resets when said bus cycle ends, and triggers an alarm indicating a hung cycle when the bus cycle has not ended after a predetermined time period;
    a cycle snoop which snoops the bus for any illegal handshake and any hung cycle triggered from the cycle timer; and
    an error capture which captures all error and failure conditions snooped from the reset snoop, the clock snoop, and the cycle snoop, and reports such error and failure conditions for system management.

7. A bus monitoring apparatus as claimed in claim 6, wherein said cycle timer comprises a programmable counter which begins counting in increments of time to determine whether the bus cycle has ended after said predetermined time period, wherein said reset snoop further snoops the bus to report whether the bus was reset, and wherein said clock snoop further snoops the bus to report whether the bus clock has died.

8. A bus monitoring apparatus as claimed in claim 7, wherein said clock snoop contains a clock snoop algorithm executed to snoop a faulty clock condition on the bus by:
    determining whether a synchronized clock indicating the local clock in synchronous with the bus clock exhibits a first logic state;
    when the synchronized clock exhibits said first logic state, resetting said counter and restarting said counting for said predetermined time;
    determining whether the synchronized clock has switched to a second logic state opposite to said first logic state during said counting;
    when the synchronized clock has not switched to said second logic state, determining whether said counting for said predetermined time period has expired; and
    when said counting for said predetermined time period has expired, determining that said faulty clock condition has occurred on the bus.

9. A bus monitoring apparatus as claimed in claim 7, wherein said cycle snoop contains a cycle snoop algorithm executed to snoop a faulty cycle condition on the bus by:
    determining whether a new cycle on the bus has started;
    when the new cycle on the bus has started, resetting said counter and restarting said counting for said predetermined time period;
    determining whether any of legal termination conditions is found on the bus;
    when any one of said legal termination conditions is found on the bus, awaiting for a new cycle;
    when none of said legal termination conditions is found on the bus, determining whether target frame and initiator ready signals are inactive;
    when the target frame and initiator ready signals are inactive, determines that an illegal handshake has occurred on the bus;
    when the target frame and initiator ready signals are not inactive, determining whether said counting for said predetermined time period has expired; and
    when said counting for said predetermined time period has expired, determines that said illegal handshake has occurred on the bus.

10. A bus monitoring apparatus as claimed in claim 6, wherein said reset snoop further snoops the bus to report to the local processor whether the bus was reset.

11. A bus monitoring apparatus as claimed in claim 6, wherein said clock snoop further snoops the bus to report to the local processor whether the bus clock has died.

12. A bus monitoring apparatus as claimed in claim 1, further comprising:
    a local reset and clock generator which provides said local reset and said local clock that are separate and independent from the host system;
    a power supply which provides optional power backup;
    a memory which stores configuration information and said operating system that is separate and independent from the host system;
    a processor which processes said configuration information and said operating system from said memory for operation; and
    a network controller which provides an interface to a computer network for communications with a remote system over said computer network.

13. A bus monitoring apparatus for tracking operation of a bus in a host system comprising:
    at least one of a local clock and a local reset which are separate and independent from the host system;
    a bus monitor having operations controlled by at least one of said local clock and said local reset, for tracking events on the bus;
    a local reset and clock generator which generates said local reset and said local clock that is separate and independent from a bus clock of the host system;
    a power supply source which provides said power supply;
    a memory which stores configuration information and an operating system that is separate and independent from the host system;
    a processor which processes said configuration information and said operating system from the memory for operation; and
    a network controller which provides an interface to a computer network for communications with a remote system over said computer network.

14. A bus monitoring apparatus as claimed in claim 5, wherein said host system is a host server on said computer network, and wherein said processor controls said network controller to transmit information indicating error and failure conditions occurred on the bus to a remote system for remote system management via said computer network.

15. A bus monitoring apparatus as claimed in claim 14, wherein said computer network comprises Ethernet, Token Ring, Fiber Data Distribution Interface (FDDI), Asynchronous Transfer Mode (ATM), and/or integrated 56-K modem.

16. A bus monitoring apparatus as claimed in claim 13, wherein said bus monitor comprises:
   a reset snoop which snoops the bus for a bus reset;
   a clock snoop which snoops the bus for a bus clock changing frequency;
   a cycle timer which begins when a bus cycle starts, resets when said bus cycle ends, and triggers an alarm indicating a hung cycle when the bus cycle has not ended after a predetermined time period;
   a cycle snoop which snoops the bus for any illegal handshake and any hung cycle triggered from the cycle timer; and
   an error capture which captures all error and failure conditions snooped from the reset snoop, the clock snoop, and the cycle snoop, and reports such error and failure conditions for system management.

17. A bus monitoring apparatus as claimed in claim 16, wherein said clock snoop contains a clock snoop algorithm executed to snoop a faulty clock condition on the bus by:
   determining whether a synchronized clock indicating the local clock in synchronous with the bus clock exhibits a first logic state;
   when the synchronized clock exhibits said first logic state, resetting said cycle timer for counting and restarting said counting for said predetermined time;
   determining whether the synchronized clock has switched to a second logic state opposite to said first logic state during said counting;
   when the synchronized clock has not switched to said second logic state, determining whether said counting for said predetermined time period has expired; and
   when said counting for said predetermined time period has expired, determining that said faulty clock condition has occurred on the bus.

18. A bus monitoring apparatus as claimed in claim 16, wherein said cycle snoop contains a cycle snoop algorithm executed to snoop a faulty cycle condition on the bus by:
   determining whether a new cycle on the bus has started;
   when the new cycle on the bus has started, resetting said cycle timer for counting and restarting said counting for said predetermined time period;
   determining whether any of legal termination conditions is found on the bus;
   when any one of said legal termination conditions is found on the bus, awaiting for a new cycle;
   when none of said legal termination conditions is found on the bus, determining whether target frame and initiator ready signals are inactive;
   when the target frame and initiator ready signals are inactive, determines that an illegal handshake has occurred on the bus;
   when the target frame and initiator ready signals are not inactive, determining whether said counting for said predetermined time period has expired; and
   when said counting for said predetermined time period has expired, determines that said illegal handshake has occurred on the bus.

19. A bus monitoring apparatus for tracking operation of a bus in a host system comprising:
   at least one of a local clock and a local reset which are separate and independent from the host system; and
   a bus monitor having operations controlled by at least one of said local clock and said local reset, for tracking events on the bus and reporting occurrence of said events including error and fault conditions, wherein said bus monitor comprises:
   a reset snoop which snoops the bus for a bus reset;
   a clock snoop which snoops the bus for a bus clock changing frequency;
   a cycle timer which begins when a bus cycle starts, resets when said bus cycle ends, and triggers an alarm indicating a hung cycle when the bus cycle has not ended after a predetermined time period;
   a cycle snoop which snoops the bus for any illegal handshake and any hung cycle triggered from the cycle timer; and
   an error capture which captures all error and failure conditions snooped from the reset snoop, the clock snoop, and the cycle snoop, and reports such error and failure conditions occurred on the bus for remote system management over a computer network.

20. A bus monitoring apparatus as claimed in claim 19, wherein said local clock and said bus clock are synchronized for said reset snoop, said clock snoop and said cycle snoop to snoop the bus for said error and failure conditions on the bus for remote system management over said computer network.

21. A bus monitoring apparatus as claimed in claim 19, wherein said cycle timer comprises a programmable counter which begins counting time to determine whether the bus cycle has ended after said predetermined time period.

22. A bus monitoring apparatus as claimed in claim 21, wherein said clock snoop contains a clock snoop algorithm executed to snoop a faulty clock condition on the bus by the steps of:
   determining whether a synchronized clock with the bus clock exhibits a first logic state;
   when the synchronized clock exhibits said first logic state, restarting said counting in increments of time for said predetermined time period;
   determining whether the synchronized clock has switched to a second logic state opposite to said first logic state during said counting;
   when the synchronized clock has not switched to said second logic state, determining whether said counting for said predetermined time period has expired; and
   when said counting for said predetermined time period has expired, determining that said faulty clock condition has occurred on the bus.

23. A bus monitor apparatus as claimed in claim 21, wherein said cycle snoop contains a cycle snoop algorithm executed to snoop a faulty cycle condition on the bus by the steps of:
   determining whether a new cycle on the bus has started;
   when the new cycle on the bus has started, restarting said counting for said predetermined time period;
   determining whether any of legal termination conditions pre-defined by standards specification is found on the bus;

when any one of said legal termination conditions is found on the bus, awaiting for a new cycle;

when none of said legal termination conditions is found on the bus, determining whether target frame (Frame#) and initiator ready (IRDY#) signals are inactive;

when the target frame (Frame#) and initiator ready (IRDY#) signals are inactive, determines that an illegal handshake has occurred on the bus;

when the target frame (Frame#) and initiator ready (IRDY#) signals are not inactive, determining whether said counting for said predetermined time period has expired; and when said counting for said predetermined time period has expired, determines that said illegal handshake has occurred on the bus.

24. A bus monitoring apparatus as claimed in claim 19, wherein said reset snoop further snoops the bus to report whether the bus was reset.

25. A bus monitoring apparatus as claimed in claim 19, wherein said clock snoop further snoops the bus to report whether the bus clock has died.

26. A card for tracking a bus in a host system for correct operation, comprising:

a clock generator which generates a local clock that is separate and independent from a bus clock of the host system;

a power supply which provides optional power backup;

a memory which stores configuration information and an operating system that is separate and independent from the host system;

a processor which processes said configuration information and said operating system from said memory for operation;

a network controller which provides an interface to a computer network for communications with a remote system over said computer network; and a bus controller which is operatively connected to said clock generator, said power supply, said processor, and said network controller, and which tracks error and fault conditions on the bus and reports such error and fault conditions to said processor for remote system management over said computer network.

27. A card as claimed in claim 26, wherein said bus includes one of a Peripheral Component Interface (PCI) bus, an Industry Standard Architecture (ISA) bus, an Extended Industry Standard Architecture (EISA) bus, and a Micro-Channel Architecture (MCA) bus.

28. A card as claimed in claim 26, wherein said bus includes a Peripheral Component Interface (PCI) bus, and wherein said error and fault conditions on the bus include ones or all the followings: (1) when a PCI reset occurred unexpectedly; (2) when a PCI clock stopped operating; (3) when a PCI bus cycle started and never completed; and (4) when a PCI cycle started and completed with an illegal handshake.

29. A card as claimed in claim 28, wherein said bus controller comprises:

a reset snoop unit which snoops the PCI bus for the PCI reset;

a clock snoop unit which snoops the PCI bus for a PCI clock radically changing frequency or dying;

a cycle timer which begins when a PCI bus cycle starts, resets when the PCI bus cycle ends, and triggers an alarm indicating a hung cycle when the PCI bus cycle has not ended after a predetermined time period;

a cycle snoop unit which snoops the PCI bus for any illegal handshake and any hung cycle triggered from the cycle timer; and an error capture unit which captures the error and fault conditions snooped from the reset snoop unit, the clock snoop unit, the cycle snoop unit, and reports such error and fault conditions to the processor for remote system management over said computer network.

30. A card as claimed in claim 29, wherein said cycle timer comprises a programmable counter which begins counting in increments of time to determine whether the PCI bus cycle has ended after said predetermined time period.

31. A card as claimed in claim 30, wherein said clock snoop unit contains a PCI clock snoop algorithm executed to snoop a faulty PCI clock condition on said PCI bus by the steps of:

determining whether a synchronized clock indicating the local clock in synchronous with the PCI bus clock exhibits a first logic state;

when the synchronized clock exhibits said first logic state, resetting said counter and restarting said counting for said predetermined time;

determining whether the synchronized clock has switched to a second logic state opposite to said first logic state during said counting;

when the synchronized clock has not switched to said second logic state, determining whether said counting for said predetermined time period has expired; and when said counting for said predetermined time period has expired, determining that said PCI faulty clock condition has occurred on the PCI bus.

32. A card as claimed in claim 30, wherein said cycle snoop unit contains a PCI cycle snoop algorithm executed to snoop a faulty PCI cycle condition on said PCI bus by the steps of:

determining whether a new PCI cycle on the PCI bus has started;

when the new PCI cycle on the PCI bus has started, resetting said counter and restarting said counting for said predetermined time period;

determining whether any of legal termination conditions defined by "PCI Local Bus Specification, Revision 2.1" is found on the PCI bus;

when any one of said legal termination conditions is found on the PCI bus, awaiting for a new PCI cycle;

when none of said legal termination conditions is found on the PCI bus, determining whether target frame (Frame#) and initiator ready (IRDY#) signals are inactive;

when the target frame (Frame#) and initiator ready (IRDY#) signals are inactive, determines that an illegal PCI handshake has occurred on the PCI bus;

when the target frame (Frame#) and initiator ready (IRDY#) signals are not inactive, determining whether said counting for said predetermined time period has expired; and when said counting for said predetermined time period has expired, determines that said illegal PCI handshake has occurred on the PCI bus.

33. A card as claimed in claim 29, wherein said reset snoop unit further snoops the PCI bus to report to the local processor whether the PCI bus was reset.

34. A card as claimed in claim 29, wherein said clock snoop unit further snoops the PCI bus to report to the local processor whether the bus clock has died.

35. A card as claimed in claim 26, wherein said computer network comprises Ethernet, Token Ring, Fiber Data Distribution Interface (FDDI), Asynchronous Transfer Mode (ATM), and/or integrated 56-K modem.

36. A card for tracking operation of a bus in a host system, comprising:
   an operating system, a power supply, and a local clock which are separate and independent from the host system; and
   a bus controller operatively connected to said operating system, said power supply, and said local clock, for tracking error and fault conditions which may occur on the bus, and for reporting such error and fault conditions occurred on the bus for system management, said bus controller comprising:
      a reset snoop which snoops the bus for a bus reset;
      a clock snoop which snoops the bus for a bus clock changing frequency;
      a cycle timer which begins when a bus cycle starts, resets when said bus cycle ends, and triggers an alarm indicating a hung cycle when the bus cycle has not ended after a predetermined time period;
      a cycle snoop which snoops the bus for any illegal handshake and any hung cycle triggered from the cycle timer; and
      an error capture which captures all error and failure conditions snooped from the reset snoop, the clock snoop, and the cycle snoop, and reports such error and failure conditions for system management.

37. A card as claimed in claim 36, wherein said cycle timer comprises a programmable counter which begins counting in increments of time to determine whether the bus cycle has ended after said predetermined time period.

38. A card as claimed in claim 36, wherein said reset snoop further snoops the bus to report whether the bus was reset, and said clock snoop further snoops the bus to report whether the bus clock has died.

39. A card as claimed in claim 36, wherein said bus includes one a Peripheral Component Interface (PCI) bus, an Industry Standard Architecture (ISA) bus, an Extended Industry Standard Architecture (EISA) bus, and a Micro-Channel Architecture (MCA) bus for serving as an interconnect transportation mechanism to transport data between highly integrated peripheral devices, peripheral add-in boards and processor/memory subsystems of the host system.

40. A card as claimed in claim 36, wherein said error and fault conditions are reported via computer network, said computer network comprises Ethernet, Token Ring, Fiber Data Distribution Interface (FDDI), Asynchronous Transfer Mode (ATM), and/or integrated 56-K modem.

* * * * *